United States Patent
Zaccardi et al.

(10) Patent No.: US 10,830,076 B2
(45) Date of Patent: Nov. 10, 2020

(54) OUTLET GUIDE VANE FOR TURBOMACHINE, MADE FROM SEVERAL PARTS ASSEMBLED TOGETHER BY ATTACHMENT MEANS OUTSIDE THE FLOW STREAM

(71) Applicant: SAFRAN AIRCRAFT ENGINES, Paris (FR)

(72) Inventors: Cedric Zaccardi, Moissy-Cramayel (FR); Christophe Marcel Lucien Perdrigeon, Moissy-Cramayel (FR); Paul Antoine Foresto, Moissy-Cramayel (FR); Adrien Jacques Philippe Fabre, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 31 days.

(21) Appl. No.: 16/270,771

(22) Filed: Feb. 8, 2019

(65) Prior Publication Data

US 2019/0249558 A1     Aug. 15, 2019

(30) Foreign Application Priority Data

Feb. 13, 2018   (FR) ...................... 18 51199

(51) Int. Cl.
*F01D 9/06* (2006.01)
*F04D 29/58* (2006.01)
(Continued)

(52) U.S. Cl.
CPC ............. *F01D 9/065* (2013.01); *F01D 9/042* (2013.01); *F01D 25/12* (2013.01); *F02C 7/14* (2013.01);
(Continued)

(58) Field of Classification Search
CPC . F01D 9/065; F01D 9/042; F01D 5/18; F01D 25/12; F02C 7/14; F02K 3/06;
(Continued)

(56) References Cited

U.S. PATENT DOCUMENTS 8,616,834 B2 * 12/2013 Knight, III .............. F01D 9/041
                                                          415/116
2008/0159851 A1    7/2008 Moniz et al.
(Continued)

FOREIGN PATENT DOCUMENTS

FR      2 989 110        10/2013
GB       523038           7/1940
(Continued)

OTHER PUBLICATIONS

U.S. Appl. No. 16/126,028, filed Sep. 10, 2018, Cedric Zaccardi, et al.
(Continued)

*Primary Examiner* — Richard A Edgar
(74) *Attorney, Agent, or Firm* — Oblon, McClelland, Maier & Neustadt, L.L.P.

(57) ABSTRACT

A guide vane located in a fan air flow in an aircraft twin-spool turbomachine, the vane being made with an extrados body and an intrados body between which there is a thermal conduction matrix. Furthermore, the attachment devices between the two spools are arranged outside the aerodynamic part of the vane.

10 Claims, 8 Drawing Sheets

(51) Int. Cl.
    *F01D 9/04*     (2006.01)
    *F04D 29/54*     (2006.01)
    *F01D 25/12*     (2006.01)
    *F02K 3/06*     (2006.01)
    *F02C 7/14*     (2006.01)

(52) U.S. Cl.
    CPC .............. *F02K 3/06* (2013.01); *F04D 29/542* (2013.01); *F04D 29/582* (2013.01); *F05D 2260/98* (2013.01)

(58) Field of Classification Search
    CPC .... F04D 29/542; F04D 29/582; F04D 29/646; F05D 2260/98
    See application file for complete search history.

(56) References Cited

U.S. PATENT DOCUMENTS

2015/0315923 A1    11/2015    Bordoni
2017/0284417 A1    10/2017    Zaccardi et al.
2017/0292531 A1    10/2017    Snyder

FOREIGN PATENT DOCUMENTS

GB    2 376 269 A    12/2002
GB    2568143 A    5/2019

OTHER PUBLICATIONS

U.S. Appl. No. 15/403,727, filed Jan. 11, 2017, 2017/0204879 A1, Cedric Zaccardi, et al.
U.S. Appl. No. 15/472,787, filed Mar. 29, 2017, 2017/0284417 A1, Cedric Zaccardi, et al.
U.S. Appl. No. 15/653,976, filed Jul. 19, 2017, 2018/0023406 A1, Cedric Zaccardi, et al.
U.S. Appl. No. 15/558,853, filed Sep. 15, 2017, 2018/0066581 A1, Cedric Zaccardi, et al.
U.S. Appl. No. 15/914,150, filed Mar. 7, 2018, 2018/0258779 A1, Mohamed-Lamine Boutaleb et al.
U.S. Appl. No. 15/936,657, filed Mar. 27, 2018, 2018-0306042 A1, Cedric Zaccardi, et al.
French Preliminary Search Report dated Oct. 3, 2018 in French Application 18 51199, filed on Feb. 13, 2018 (with English Translation of Categories of Cited Documents).

\* cited by examiner

OUTLET GUIDE VANE FOR TURBOMACHINE, MADE FROM SEVERAL PARTS ASSEMBLED TOGETHER BY ATTACHMENT MEANS OUTSIDE THE FLOW STREAM

TECHNICAL DOMAIN

This invention relates to the field of twin-spool turbomachines for aircraft, and particularly the design of guide vanes arranged in all or part of a turbomachine fan air flow.

These are preferably "Outlet Guide Vanes" (OGV), designed to straighten the air flow at the fan outlet. Alternatively or simultaneously, guide vanes could be placed at the fan intake. The guide vanes are conventionally located in the turbomachine fan flow stream.

The invention preferably relates to an aircraft turbojet fitted with such outlet guide vanes.

State of Prior Art

On some twin-spool turbomachines, it is known that outlet guide vanes can be installed downstream from the fan to straighten the outlet flow from the fan, and possibly also to perform a structural function. This structural function is intended to transfer forces from the centre of the turbomachine to an outer shell located along the prolongation of the fan case. In this case, an engine attachment is conventionally formed on or close to this outer shell, to form the attachment between the turbomachine and an aircraft attachment pylon.

It was also recently disclosed that an additional function can be assigned to the outlet guide vanes. This is a heat exchanger function between the outside air passing through the ring of outlet guide vanes, and lubricant circulating inside these vanes. This heat exchange function is for example known as disclosed in document U.S. Pat. No. 8,616,834, or document FR 2 989 110.

Lubricant to be cooled by the outlet guide vanes can originate from different zones of the turbomachine. It can be a lubricant circulating through lubrication chambers of roller bearings supporting engine shafts and/or the fan hub, or a lubricant used for lubrication of mechanical transmission elements of the Accessory Gear Box (AGB). Finally, it can also be used for lubrication of a fan drive reduction gearbox, when such a reduction gearbox is provided on the turbomachine to reduce the rotation speed of its fan.

Increasing lubricant needs require that the heat dissipation capacity associated with exchangers designed for cooling the lubricant should be adapted accordingly. The fact that a role of heat exchanger is assigned to the outlet guide vanes, as in the solutions in the two documents mentioned above, can in particular reduce or even eliminate conventional Air Cooled Oil Cooler (ACOC) type exchangers. Since these ACOC exchangers are generally formed in the fan flow path, reducing or eliminating them can limit disturbances in the fan flow and thus increase the global efficiency of the turbomachine.

Obstacles to lubricant circulation such as studs designed to disturb the lubricant flow and increase the wetted area can be installed in the lubricant internal cooling passage, with the objective of obtaining a better heat exchange.

However, it may be difficult or even impossible to make this type of vane with some techniques that are otherwise considered to be attractive. One such example is additive fabrication, also called 3D printing or direct fabrication, that may prove to be unsuitable for the manufacture of a vane including the matrix in one piece, particularly when the dimensions of this vane are too large and/or in the case of a network of pads with a geometry that is unsuitable for additive fabrication.

It has been suggested that this problem can be solved by making the vane in several separate parts, to facilitate its fabrication. However, this type of design normally requires the presence of attachment means located on the aerodynamic part of the vane. These attachment means between the different components of the vane can generate aerodynamic losses on the flow passing through this vane.

SUMMARY OF THE INVENTION

In order to at least partly overcome the disadvantages experienced with embodiments in prior art, the first purpose of the invention is a guide vane that will be arranged in all or some of an air flow output from an aircraft twin-spool turbomachine fan, the guide vane comprising an aerodynamic part for straightening the flow that will be matched by said all or some of the fan air flow, said vane being made using:

an intrados body defining at least a part of an intrados surface of the aerodynamic part, the intrados body comprising at least one first tip attachment element designed to attach the vane onto an external element of the case, and at least one first root attachment element designed to attach the vane onto an internal element of the case;

an extrados body defining at least a part of an extrados surface of the aerodynamic part, the extrados body comprising at least a second tip attachment device designed to attach the vane to an external element of the case, and at least one second root attachment element designed to attach the vane to an internal element of the case;

a thermal conduction matrix arranged in a space delimited between the intrados and extrados bodies, said matrix being designed so that lubricant passes through it and including obstacles to the circulation of lubricant; and means of attachment of the intrados body onto the extrados body.

According to the invention, said means of attachment of the intrados body onto the extrados body are composed of first attachment means arranged radially outwards from the first and second tip attachment elements, and by second attachment means arranged radially inwards from the first and second root attachment elements.

Consequently, the invention provides a solution to facilitate its fabrication, while having good aerodynamic performances. Fabrication of the vane is simplified by the large number of components adopted, each of the components can be made using conventional techniques, even for large vanes. Furthermore, the fact that the attachment means of these components is taken outside the aerodynamic part of the vane prevents deterioration of the aerodynamic flow passing through the vane.

The invention this provides a satisfactory compromise that gives an efficient solution to the problem that arises, particularly by separating the thermal, aerodynamic and possibly structural functions of the vane.

Consequently, the invention facilitates fabrication and low cost and gives better aerodynamic performances.

The invention preferably includes at least any one of the following optional characteristics, taken in isolation or in combination.

Said first attachment means and said second attachment means comprise bolts passing through passage orifices formed through the intrados and extrados bodies. Alternatively or simultaneously, these attachment means may be of the welding, brazing or bonding type.

Said thermal conduction matrix comprises an external duct leaktight to lubricant, arranged in said space delimited between the intrados and extrados bodies. According to one alternative embodiment, the vane comprises a lubricant sealing device formed between the intrados and extrados bodies. This arrangement is adopted particularly when the matrix used is permeable in nature.

Said space housing the thermal conduction matrix is generally in the form of a U defining two lubricant passages connected together by a bend. Alternatively, the space can define a single passage, or two passages that will be connected to each other outside the vane.

The thermal conduction matrix is made in a single piece, or using several distinct matrix elements arranged end to end or separated from each other.

Another purpose of the invention is an aircraft turbomachine, preferably a turbojet, comprising a plurality of guide vanes like that described above, these vanes being arranged downstream or upstream from a fan of the turbomachine.

Preferably, the first and second attachment means are arranged outside said complete or partial fan air flow, delimited by at least one aerodynamic wall located between the external and internal elements of the case.

Finally, one purpose of this invention is a method of fabrication of a vane like that described above, including the following steps:

a) make intrados and extrados bodies and said thermal conduction matrix;

b) attachment of the intrados body on the extrados body, using first and second attachment means.

Preferably the thermal conduction matrix is made independently of the intrados and extrados bodies, and preferably using the additive fabrication technique.

Alternatively, at least part of the thermal conduction matrix can be made in a single piece with at least one of the intrados and extrados bodies. For example, all obstacles in the matrix be made in a single piece with one of the intrados and extrados bodies. According to another example, some of these obstacles can be made in a single piece with one of the intrados and extrados bodies, and other obstacles made as a single piece with the other of these two bodies.

Other advantages and characteristics of the invention will become clear after reading the following detailed non-limitative description.

BRIEF DESCRIPTION OF THE DRAWINGS

This description will be made with reference to the appended drawings among which.

DETAILED DESCRIPTION OF PREFERRED EMBODIMENTS

Figure 1:
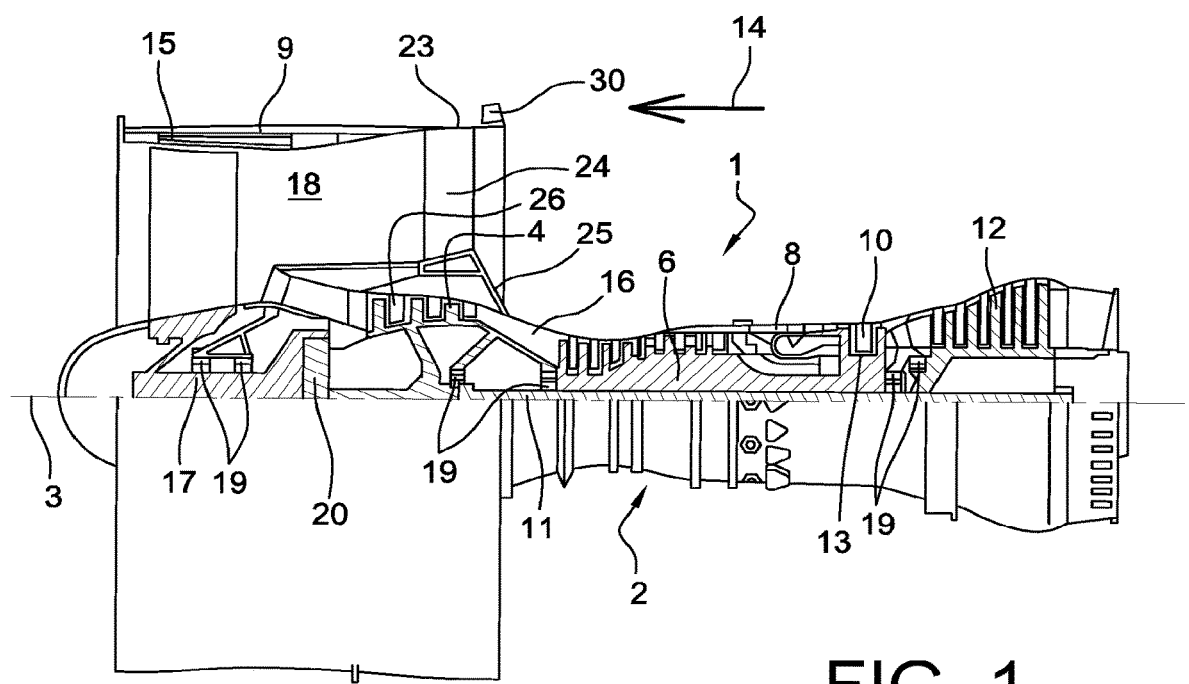
FIG. 1 represents a diagrammatic side view of a turbojet according to the invention.

With reference to FIG. 1, the figure represents a twin-spool twin-flow turbojet, with a high dilution ratio. The turbojet 1 conventionally comprises a gas generator 2 with a low pressure compressor 4 on one side and a low pressure turbine 12 on the other side, this gas generator 2 comprising a high pressure compressor 6, a combustion chamber 8 and a high pressure turbine 10. In the following, the terms "forward" and "aft" are considered along a direction 14 opposite to the main flow direction of gases in the turbojet, this direction 14 being parallel to the longitudinal axis 3 of the turbojet. On the other hand, the terms "upstream" and "downstream" are considered along the main flow direction of gases within the turbojet.

The low pressure compressor 4 and the low pressure turbine 12 form a low pressure case, and are connected to each other through a low pressure shaft 11 centred on the axis 3. Similarly, the high pressure compressor 6 and the high pressure turbine 10 form a high pressure case, and are connected to each other through a high pressure shaft 13 centred on the axis 3 and arranged around the low pressure shaft 11. The shafts are supported by bearing blocks 19 that are lubricated by being located in oil chambers. The same applies for the fan hub 17, also supported by roller bearings 19.

The turbojet 1 also comprises a single fan 15 located forward from the gas generator 2 and the low pressure compressor 4, that in this case is located directed aft from an engine nose dome. The fan 15 rotates about the axis 3, and is surrounded by a fan case 9. On FIG. 1, it is not driven by the low pressure shaft 11 directly, but is only driven by this shaft indirectly through a reduction gear 20, so that it can rotate at a lower speed. Nevertheless, a direct drive solution for the fan 15, by the low pressure shaft 11, is within the scope of the invention.

Furthermore, the turbojet 1 defines a core flow path 16 through which a core flow will pass, and a fan flow path 18 through which a fan flow will pass and that is radially outside the core flow, therefore the fan flow being separated. As is well known to an expert in the subject, the fan flow path 18 is delimited radially externally partly by an outer shell 23, preferably metallic, prolonging the fan case 9 in the aft direction. Alternatively, an aerodynamic wall forms the external delimitation of the fan air flow 18 as will be explained in detail below with reference to FIG. 9.

Although not shown, the turbojet 1 integrates a set of equipment, for example such as a fuel pump, a hydraulic pump, alternator, starter, variable stator vane (VSV) actuator, discharge valve actuator, or electrical power generator. In particular, there is equipment for lubrication of the reduction gear 20. This equipment is driven by an accessories gear box (AGB) (not shown) that is also lubricated.

There is a ring of guide vanes that in this case are outlet guide vanes 24 (OGV) in the bypass flow path 18, downstream from the fan 15. These stator vanes 24 connect an external case element, in this case the external shell 23, to an internal element of the case 25 arranged outside a case 26 of the low pressure compressor 4. In this case, the internal element of the case 25 corresponds to the intermediate case hub and the root of the vanes 24 fits into it. In this respect, note that the external shell 23 forms the periphery of this intermediate case, of which the vanes 24 also form part by mechanically connecting these two elements 23, 25. Finally, it should be noted that the intermediate case hub 25 is mechanically connected to the reduction gear 20, so as to form a path through which forces can be transferred towards an engine attachment 30 supported by the external shell 23.

The vanes 24 are circumferentially spaced from each other to straighten the fan flow after it has passed through the fan 15. Furthermore, as already mentioned, these vanes can also perform a structural function. They then transfer forces from the reduction gear 20 and roller bearings 19 associated with the engine shafts and the fan hub, to the outer shell 23 and its engine attachment 30 (that will connect the engine to an attachment pylon).

Finally, in the example embodiments described herein, the outlet guide vanes 24 perform a third heat exchanger function between the fan air flow passing through the ring of vanes, and the lubricant circulating inside these vanes 24. The lubricant that will be cooled by the outlet guide vanes 24 is the lubricant that lubricates the roller bearings 19, and/or the turbojet equipment, and/or the accessories gearbox, and/or the reduction gear 20. These vanes 24 thus form part of the fluid circuit(s) in which lubricant is circulated to lubricate the associated element(s) successively, and then to be cooled.

With reference to FIGS. 2 to 8, we will describe one of the outlet guide vanes 24, according to one first preferred embodiment of the invention. It should be noted that the invention as it will be described with reference to these figures can be applied to all vanes 24 of the stator ring centred on the axis 3, or only to some of these vanes.

Figure 2:
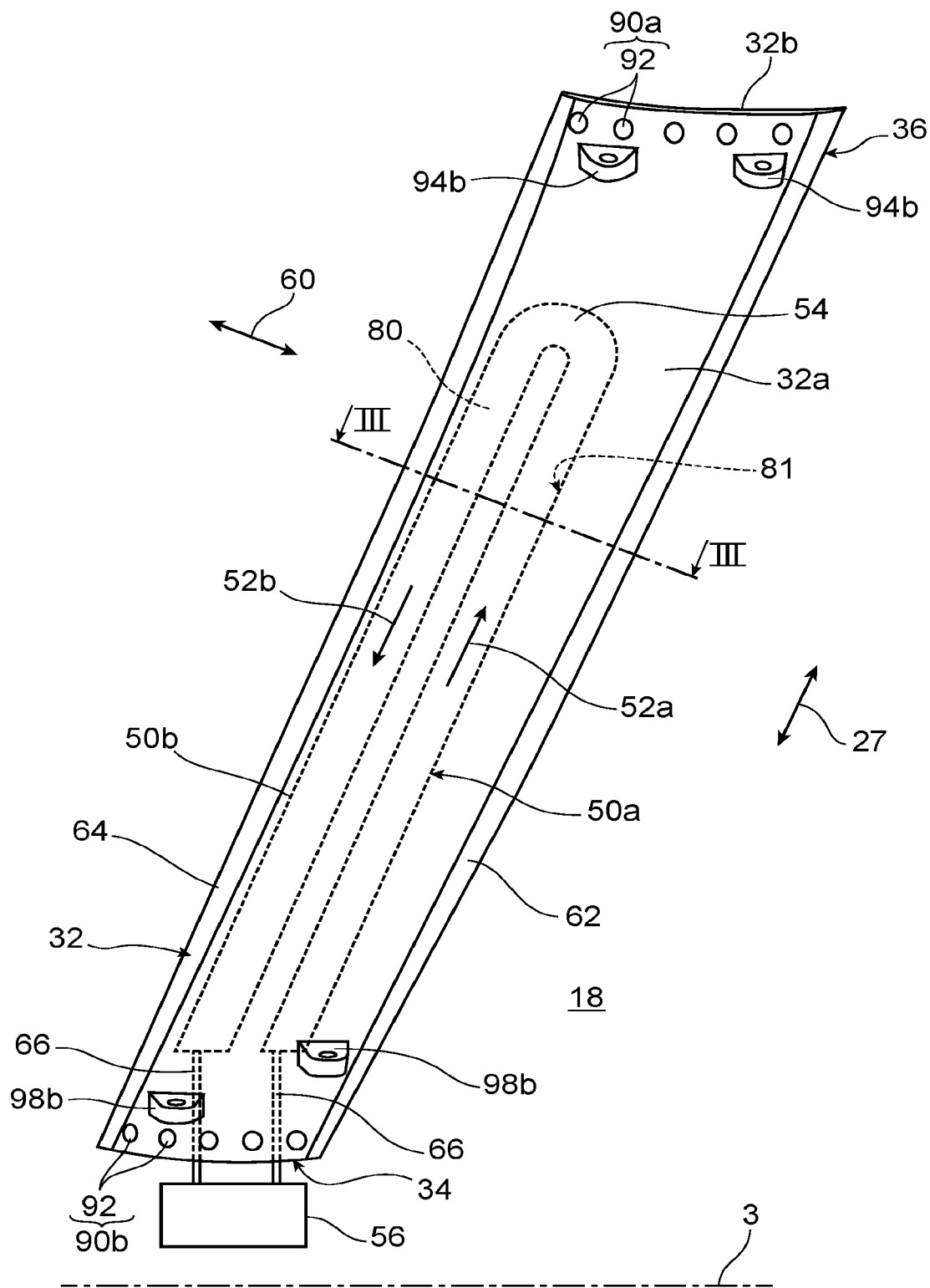
FIG. 2 represents a more detailed enlarged view of an outlet guide vane of the turbojet shown on the preceding figure, the vane being in accordance with a first preferred embodiment of the invention.

The vane 24 may be oriented precisely along the radial direction as shown on FIG. 1, or it can be slightly inclined in the axial direction towards the upstream or downstream direction, as shown on FIG. 2. In all cases, it is preferably straight when viewed from the side as shown on FIG. 2, and extends along a direction of the length 27.

The outlet guide vane 24 comprises an aerodynamic part 32 that corresponds to its central part, in other words the part exposed to the fan flow passing through the fan flow path 18. The vane 24 comprises a root 34 on one side of this aerodynamic part 32 straightening the outlet flow from the fan, and a tip 36 on the other side.

The root 34 is used to fix the vane 24 to the internal element of the case, while the tip 36 is used to fix this vane onto the outer shell prolonging the fan case. Although not represented, the vane 24 can comprise platforms at its root and its tip to reconstitute the fan flow path between the vanes 24 along the circumferential direction. Alternatively, these platforms can be add-on elements between the blade roots and tips, without going outside the framework of the invention.

As will be described in detail later, the vane 24 is preferably fabricated from two add-on bodies 32a, 32b fixed one onto the other, and a thermal conduction matrix 80 fixed in a space 81 delimited between these bodies.

In this preferred embodiment of the invention, the aerodynamic part 32 is equipped with two internal passages 50a, 50b approximately parallel to each other and parallel to the length direction 27. More precisely, a first internal lubricant cooling passage 50a extends along a first main flow direction 52a of the lubricant. This direction 52a is approximately parallel to the length direction 27, along the direction from the root 34 towards the tip 36. Similarly, there is a second internal lubricant cooling passage 50b that extends along a second main flow direction 52b of the lubricant, within this passage. This direction 52b is also approximately parallel to the length direction 27, along the opposite direction from the tip 36 towards the root 34. Therefore the first passage 50a is designed so that lubricant can pass through it radially outwards, while the second passage 50b is designed so that lubricant passes through it radially inwards. The radially outer ends of the two passages 50a, 50b are connected by a fluid connection passing through a 180° bend 54, this bend 54 also being defined by the space 81, to enable a passage from one to the other. Alternatively, the passages 50a, 50b are not connected to each other within the aerodynamic part 32 of the vane 24, but each extends separately over the entire length of the vane. A fluid connection can be made between the two passages outside the vane 24, for example using a connection bend formed radially outwards from the vane tip 36, for example bearing on this tip.

The internal radial ends of the two passages 50a, 50b are connected to the lubricant circuit, diagrammatically represented by element 56 on FIG. 2. In particular, this circuit 56 comprises a pump (not shown), that imposes the required circulation direction on the lubricant through the passages 50a, 50b, namely to introduce lubricant through the inner radial end of the first passage 50a, and to extract lubricant through the inner radial end of the second passage 50b. Connectors 66 make the fluid communication between the internal radial ends of the passages 50a, 50b and the circuit 56, these connectors 66 passing through the root 34. The connectors 66 passing through the root 34 can also be defined by the space 81.

The two passages 50a, 50b and the bend 54 together form an approximately U shape 81, with the first passage 50a and the second passage 50b offset from each other along a transverse direction 60 of the vane approximately orthogonal to the length direction 27. Heat exchanges are optimised by having the first passage 50a is on the side of a trailing edge 62 of the vane 24, while the second passage 50b is on the side of a leading edge 64. However, an inverse situation can be adopted without going outside the scope of the invention. Note also that the invention may include an aerodynamic part 32 with only one internal cooling passage. In this case, lubricant would pass through some of the vanes from inside to outside, while lubricant would pass through other vanes in the opposite direction.

The body 32a of the vane corresponds to an extrados body that in this case defines the entire extrados surface 72 of the aerodynamic part 32. This body 32a also defines the leading edge 64, the trailing edge 62, the part of the root blade 34 located on the side of the extrados surface, and the part of the blade tip located at the side of this same extrados surface 72. At the opposite side of the extrados surface 72, the body 32a delimits an inset 71 referenced on FIG. 6, this inset housing the other body 32b corresponding to an intrados body. Once the bodies 32a, 32b have been assembled, the inside surface of the body 32a that delimits the inset 71, participates in the definition of the space 81 forming the two internal passages 50a, 50b.

In this case, the intrados body 32b defines the entire intrados surface 70 of the aerodynamic part 32. A U shaped cavity is formed in its thickness to define a space 81, and more precisely the two internal passages 50*a*, 50*b*, and the bend 54. This cavity is open on the surface opposite the intrados surface 70, the opposite surface that will be forced into contact in the bottom of the inset 71 in the extrados body 32*a*. The cavity defines a solid zone 76 between the two passages 50*a*, 50*b* that will also be forced in to contact in the bottom of the inset 71, as can be seen on FIG. 3. A lubricant sealing device is also represented on this figure. It is a seal 73 arranged at the interface between the two bodies 32*a*, 32*b*, so as to keep the lubricant in the internal passages 50*a*, 50*b*. This seal 73 can be completed by other seals at the interface between the two bodies.

Each of these two bodies 32*a*, 32*b* is made of a single piece composed of a metallic material, for example by forging or by casting, that are techniques that can give the surface condition required for the intrados and extrados surfaces.

There is a thermal conduction matrix 80 in the passages defined by these intrados and extrados bodies, preferably U shaped so as to fill in the entire space 81. The presence of this matrix can improve heat exchange performances, particularly because it provides an increase in the wetted area on the side of the lubricant that passes through the passages 50*a*, 50*b*. This matrix 80 also disturbs the lubricant passage, thus generating turbulence that directly influences the convection coefficient of lubricant passing through the matrix. Such a matrix can thus be defined so as to maximise the exchange performance, while minimising head losses between the vane inlet and outlet.

Figure 3:
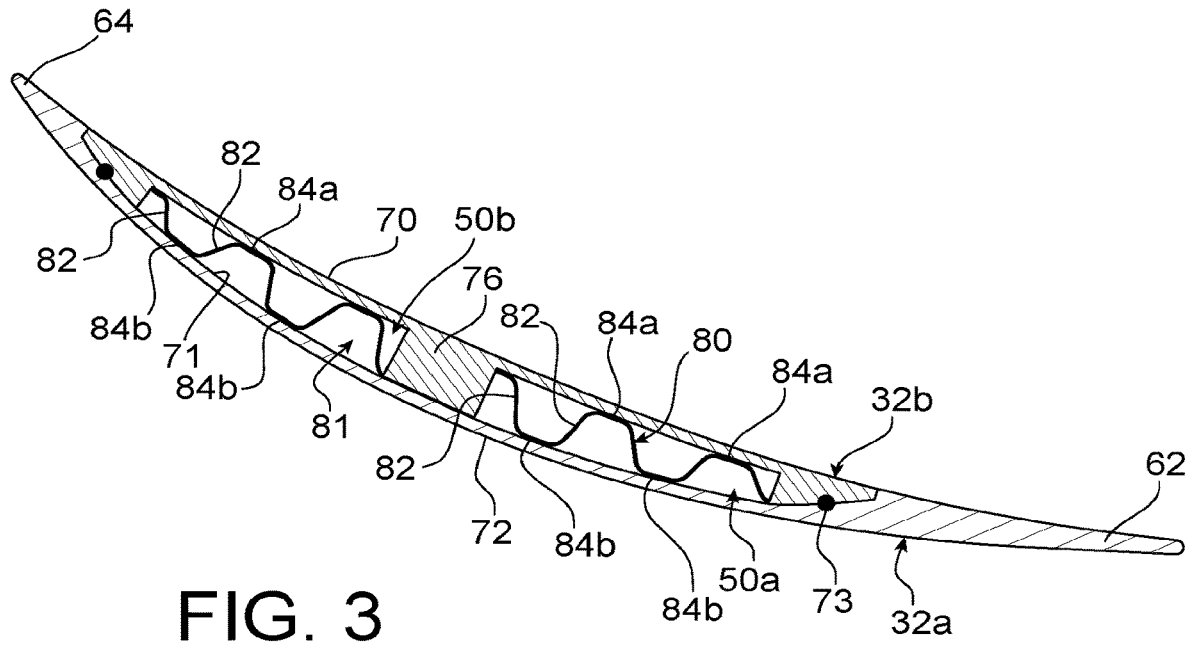
FIG. 3 corresponds to a sectional view along line III-III in FIG. 2.

In the embodiment shown on FIG. 3, the matrix 80 is independent of the bodies 32*a*, 32*b*, and is inherently permeable to the lubricant that passes through it. It then comprises a plurality of obstacles to the circulation of lubricant, these obstacles 82 being in the form of pads, walls, tabs, lattices or other similar elements extending through the thickness of the passages 50*a*, 50*b*, and connected to each other. As mentioned above, this matrix could consist of simple obstacles connected in a single piece with the extrados body 32*a* and/or with the intrados body 32*b*.

More precisely, the obstacles 82 are connected to each other through contact elements 84*a* bearing in contact with the intrados body 32*b*, and by opposing contact elements 84*b*, bearing in contact with the extrados body 32*a*. The obstacles 82 may be staggered or in rows. For example, their density may be about 3 obstacles/cm². More generally, the density is between about 1 and 5 obstacles/cm² on average, this density being uniform or varying along the lubricant path. The thickness of the matrix 80 may be of the order of several millimetres, that corresponds to the thickness of the internal passages in which it is housed.

It may be fabricated from an alloy based on aluminium or titanium, or any other material deemed to have good heat dissipation properties. This matrix 80 is preferably made by additive fabrication, also called 3D printing, without requiring a structural function considering that the structural function is conferred by the two bodies 32*a*, 32*b*. One of the following techniques can be used for fabrication of the matrix 80:
- Selective Laser Melting" (SLM) or "Electron Beam Melting" (EBM);
- "Selective Laser Sintering" (SLS) or sintering by electron beam;
- any other type of powder solidification technique under the action of a medium to high power energy source, the principle being to melt or sinter a metallic powder bed by laser beam or electron beam.

Other more conventional techniques can be envisaged, such as stamping or punching.

To facilitate fabrication of the matrix 80, instead of being made of a single piece along the full length of the U, it can be made using several distinct matrix elements, arranged end to end or at a spacing from each other. For example, it can be made using three matrix elements corresponding to the two arms of the U and to its base. The smaller size of these matrix elements makes it easier to fabricate them by additive fabrication.

Figure 3A:
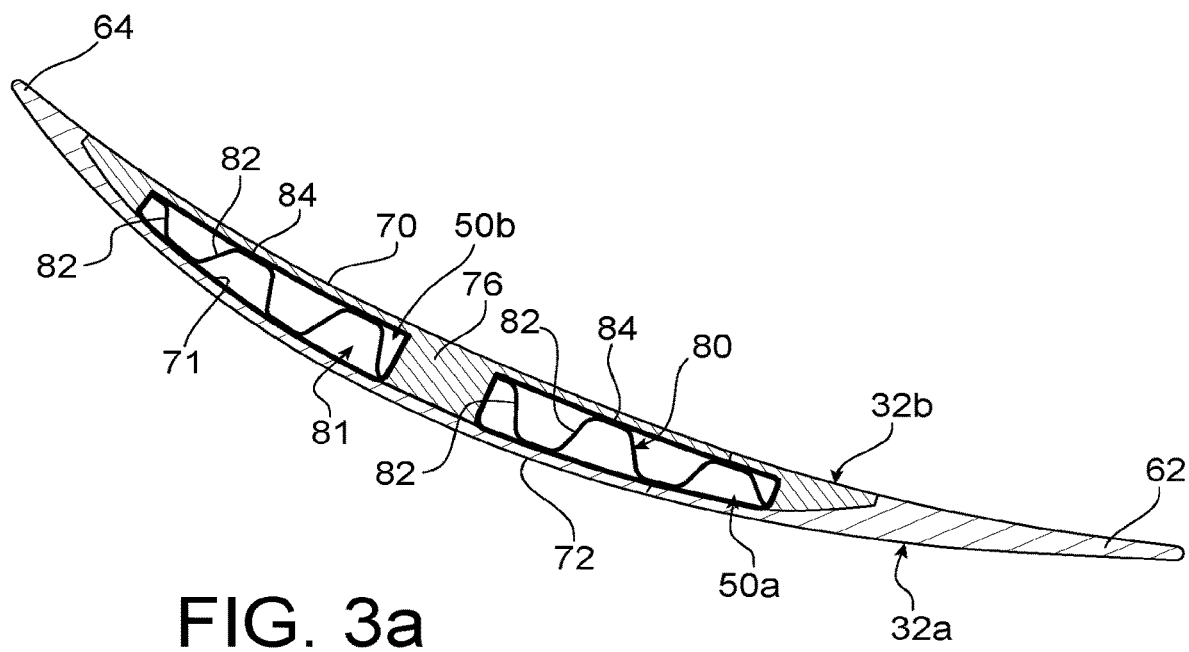
FIG. 3a is a view similar to that in FIG. 3, showing an alternative embodiment.
Figure 4:
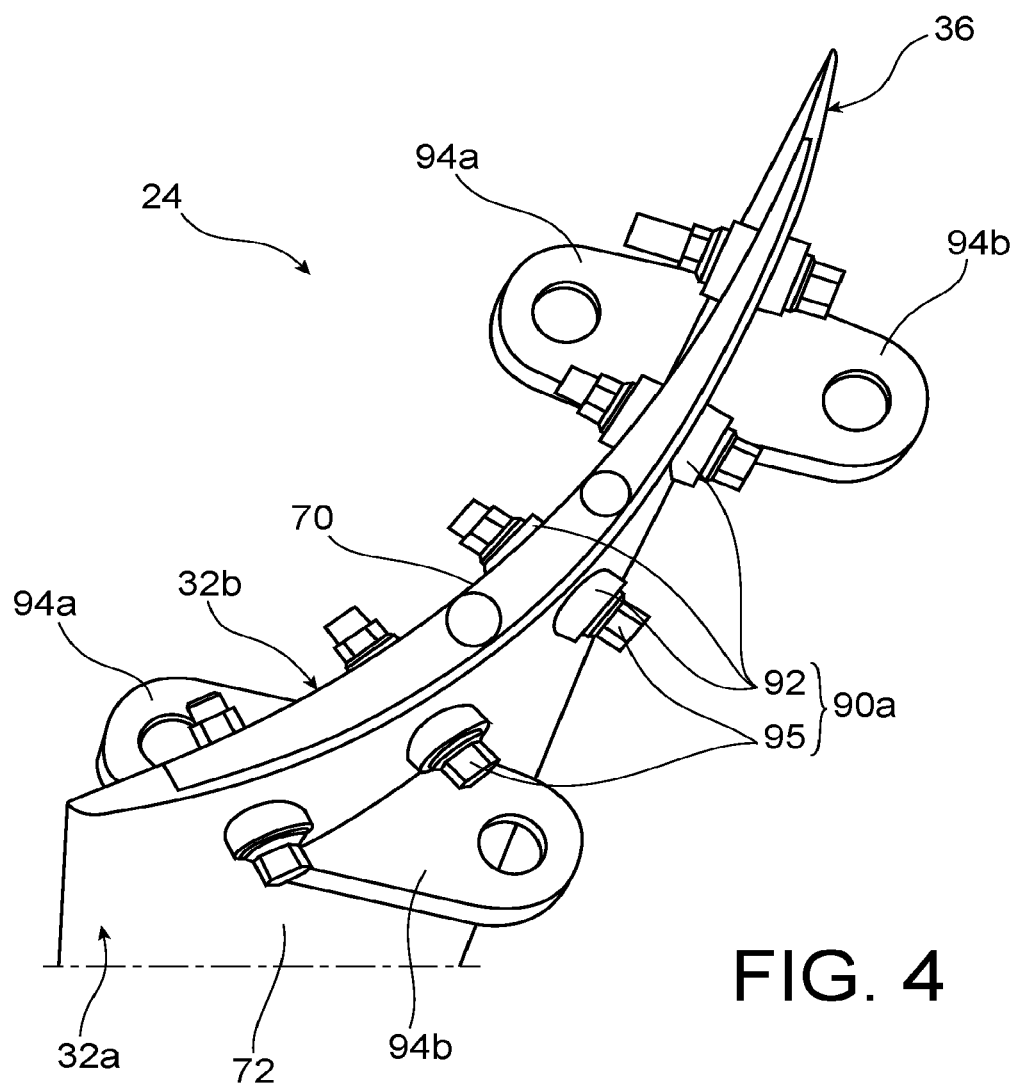
FIG. 4 represents a perspective view of part of the vane shown on the preceding figures.
Figure 5:
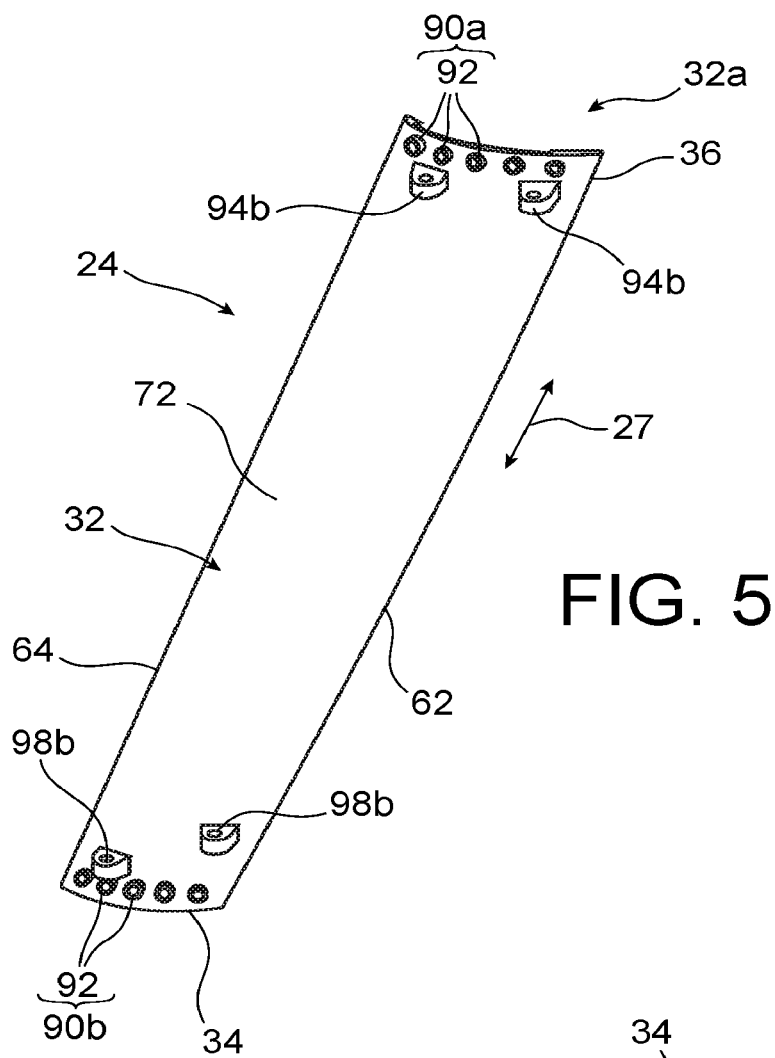
FIG. 5 represents a perspective view of the extrados body forming part of the vane shown on the preceding figures.
Figure 6:
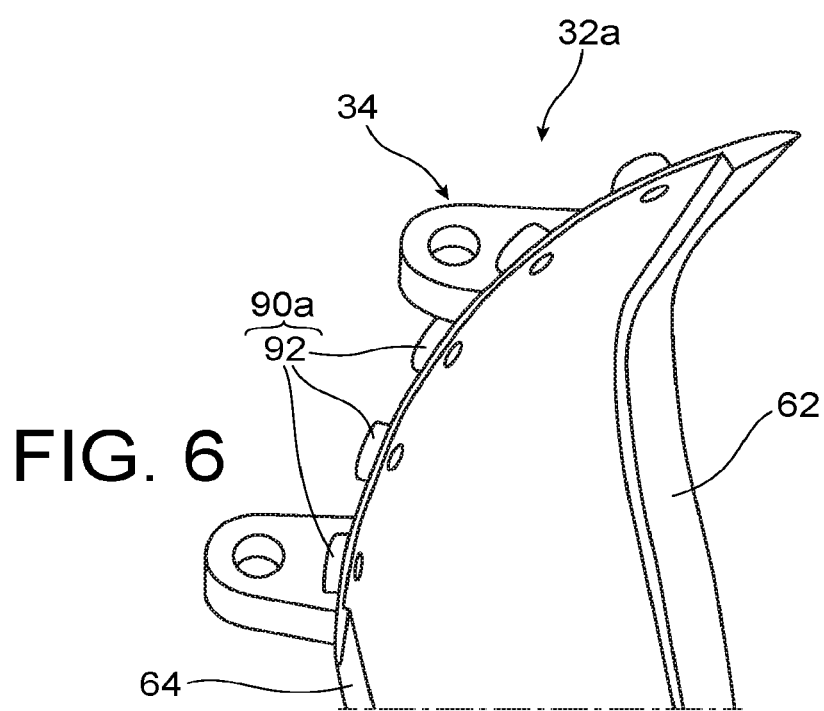
FIG. 6 represents a perspective view similar to the preceding view, from another viewing angle.
Figure 7:
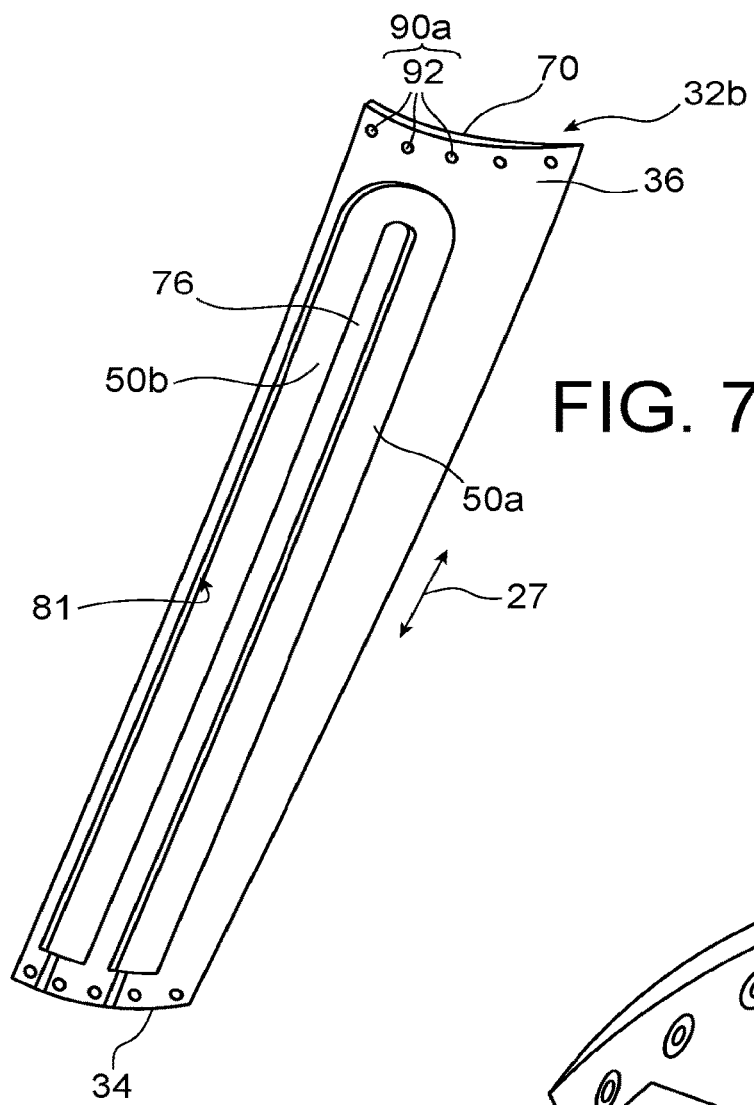
FIG. 7 represents a perspective view of the intrados body forming part of the vane shown on the preceding figures.
Figure 8:
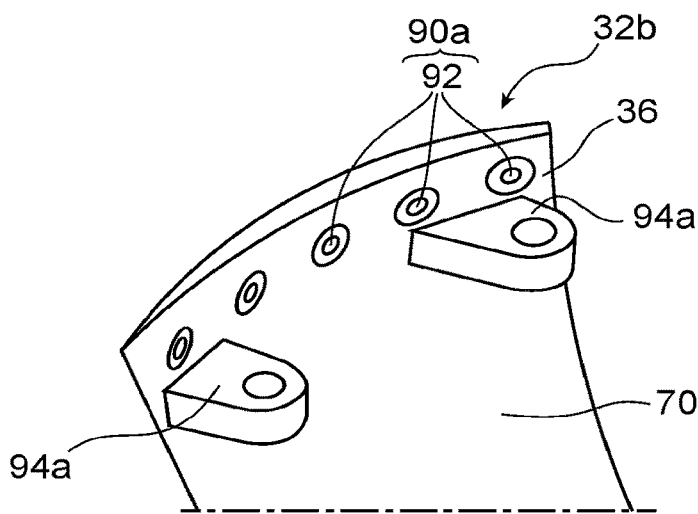
FIG. 8 represents a perspective view similar to the preceding view, from another viewing angle.
Figure 8:
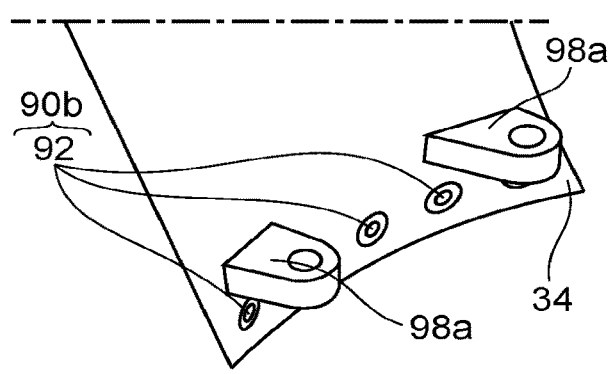

According to one alternative embodiment shown diagrammatically on FIG. 3*a*, the matrix 80 comprises an outer duct 84 sealed to lubricant, and arranged to be in contact with the two bodies 32*a*, 32*b*. This duct 84 is in practically the same shape as the space 81 in which is it located. The lubricant thus remains confined in the duct 84, which means that there is no longer any need for use of the sealing device 73 in the embodiment shown in FIG. 3. The obstacles 82 thus connect the opposite wall portions of the duct 84, according to a configuration identical to or different from that in FIG. 3.

With reference once again to FIG. 2, during operation of the engine, lubricant circulating through the circuit 56 is introduced into the first internal passage 50*a* along the first radially outwards direction 52*a*. The lubricant temperature at this stage is high. Heat exchange then takes place between this lubricant following the matrix 80 of the first passage 50*a*, and the fan flow following the external surface of the intrados and extrados walls. After having been redirected by the bend 54 into the second passage 50*b*, the lubricant is similarly cooled in this passage, still by heat exchange with the fan air flow, while circulating along the second main flow direction 52*b*. The cooled lubricant is then extracted from the vane 24 and redirected through the closed circuit 56 towards elements to be lubricated and/or to a lubricant tank from which the cooled lubricant is pumped to lubricate elements.

One of the special features of the invention lies in the attachment of the extrados body to the intrados body 32*b*. The attachment means used to mechanically connect these two bodies 32*a*, 32*b* are at a distance from the aerodynamic part 32 of the vane, so that they are exclusively at the root 34 and the tip 36 of this vane. This prevents aerodynamic disturbances of the fan flow, that no longer encounters these attachment means of the two bodies.

To achieve this, the means concerned are composed of first attachment means 90*a* associated with the tip 36 of the vane, and second attachment means 90*b* associated with the root 34 of the vane. More precisely, the first attachment means 90*a* are arranged radially outwards from the first and second attachment elements of the vane tip on the outer shell 23. These first and second tip attachment elements 94*a*, 94*b* are provided on the intrados body 32*b* and on the extrados body 32*a* respectively, at a radially outer part of these bodies. Obviously, the radial direction must be understood as corresponding to the direction of the length 27 of the vane.

The elements 94*a*, 94*b* are preferably in the form of fittings made in a single piece with the vane, and extend approximately along the axial direction. They define orifices through which screw or bolt type attachment elements 96 pass as shown diagrammatically on FIG. 9, with the purpose of making the mechanical connection between the vane tip and the external shell 23. Preferably, two elements 94*a* are provided on the intrados body 32*b*, and two elements 94*b* are provided on the extrados body 32*a*, with orifices arranged approximately through these elements.

Thus, the first attachment means 90a of the bodies 32a, 32b are arranged radially outwards from these tip attachment elements 94a, 94b. The first means 90a comprise orifices 92 forming a passage through these two bodies, and screw or bolt type attachment elements 95 passing through these orifices 92. Preferably, each body has an approximately axial row of passage orifices 92; formed in the tip part of the body concerned. In other words, this row is in the tip part of the body concerned, approximately along the direction of the chord of the vane.

Figure 9:
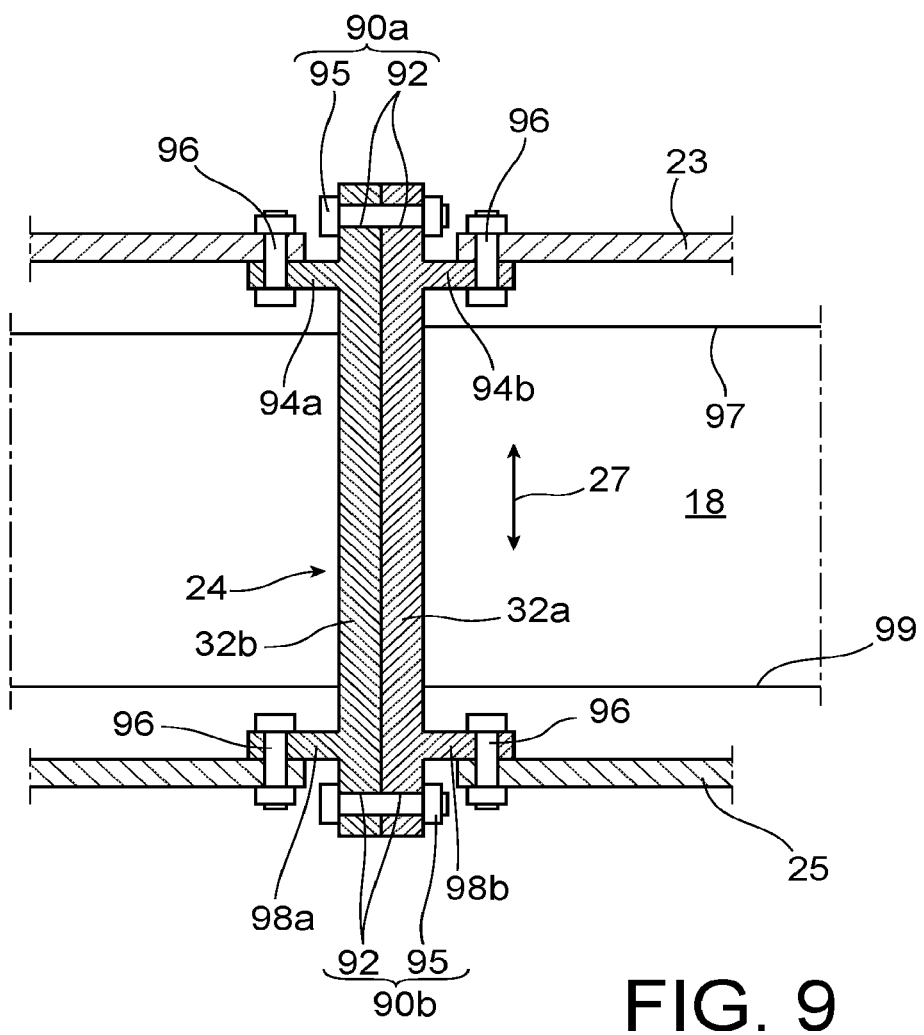
FIG. 9 is a diagrammatic longitudinal sectional view of a part of the turbojet comprising the vane shown on the preceding figures.

In the example shown on FIG. 9, the fan flow path 18 is not delimited on the exterior by the shell 23, but instead is delimited by a non-structural aerodynamic wall 97 arranged radially inwards from the tip attachment elements 94a, 94b. Consequently, this wall 97 masks all elements 90a, 94a, 94b in the fan flow.

Similarly, the second attachment means 90b are arranged radially inwards from the first and second vane root attachment elements onto the intermediate case hub 25. These first and second root attachment elements 98a, 98b are provided on the intrados body 32b and on the extrados body 32a respectively, at a radially inner part of these bodies.

The elements 98a, 98b are preferably in the form of fittings made in a single piece with the vane, and extend approximately in the axial direction. They define orifices through which screw or bolt type attachment elements 96 pass as shown diagrammatically on FIG. 9, in order to form the mechanical link with the vane root and the intermediate case hub 25. Preferably, two elements 98a are provided on the intrados body 32b, and two elements 98b are provided on the extrados body 32a, with orifices arranged approximately along the radial direction through these elements.

Thus, the second attachment means 90b of the bodies 32a, 32b are arranged radially inwards from these root attachment elements 98a, 98b. The second means 90b comprise passage orifices 92 passing through the two bodies, and screw or bolt type attachment elements 95 passing through these orifices 92. Preferably, each body comprises an approximately axial row of passage orifices 92, formed in the root part of the body concerned.

In the example shown on FIG. 9, the fan flow path 18 is not delimited internally by the intermediate case hub 25, but rather by a non-structural aerodynamic wall 99 formed radially outwards from the root attachment elements 98a, 98b. Consequently, this wall 99 masks all elements 90b, 98a, 98b in the fan flow.

Alternatively, note that the first and second attachment means 90a, 90b described above can be replaced by welding, brazing or bonding type means, all located outside the aerodynamic part 32.

Finally, note that the vane 24 can easily be fabricated by making each of its three constituent parts separately, namely the two bodies 32a, 32b and the matrix 80, and then putting the matrix into place in the space 81 between the two bodies, before fixing them using bolts 95.

Figure 10:
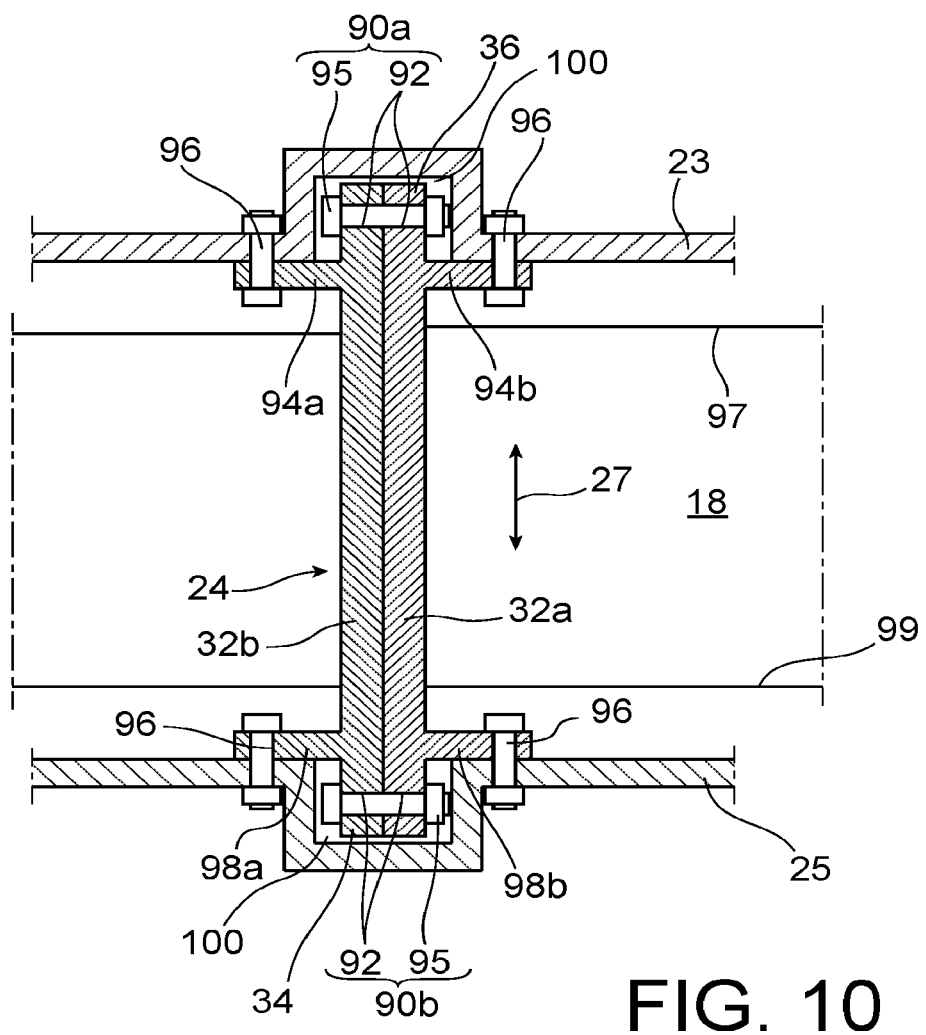
FIG. 10 is a view similar to that in FIG. 9, according to an alternative embodiment.

The example in FIG. 10 is similar to the example in FIG. 9; The only differences lie in the design of the shell 23 and the intermediate case hub 25, at the vanes 24. In this other example shown on FIG. 10, the elements 23, 25 define housings 100 in which the vane roots 34 and tips 34 are inserted.

Obviously, an expert in the subject can make various modifications to the invention as it has just been described solely through non-limitative examples, within the scope delimited by the appended claims. In particular, note that in the case (not shown) of inlet guide vanes to straighten the air flow upstream from the fan, these vanes are located in the entire fan air flow around a non-rotating nose dome, the roots of the vanes then being connected to this fixed nose dome.

Furthermore, other engine architectures known as "aircraft twin-spool turbomachines" also lie within the framework of the invention. For example, it may be a triple-body architecture (namely comprising three shafts connecting first turbine stages to a fan, second turbine stages to low pressure compressor stages, and third turbine stages to high pressure compressor stages).

The invention claimed is:

1. A guide vane intended to be arranged in all or part of a fan air flow of an aircraft twin spool turbomachine, the guide vane comprising an aerodynamic flow straightening part that intended to be followed by said all or part of the fan air flow, said vane being composed of:
   an intrados body defining at least part of an intrados surface of the aerodynamic part, the intrados body comprising at least one first tip attachment element designed to attach the vane on an external element of a case, and at least one first root attachment element designed to fasten the vane on an internal element of the case;
   an extrados body defining at least part of an extrados surface of the aerodynamic part, the extrados body comprising at least one second tip attachment element designed to attach the vane on the external element of the case, and at least one second root attachment element designed to fasten the vane on the internal element of the case;
   a thermal conduction matrix arranged in a space delimited between the intrados and extrados bodies, said matrix being designed so that lubricant passes through the matrix and including obstacles to the circulation of lubricant; and
   means of attachment of the intrados body onto the extrados body,
   wherein said means of attachment of the intrados body onto the extrados body are composed of first attachment means arranged radially outwards from the first and second tip attachment elements, and by second attachment means arranged radially inwards from the first and second root attachment elements.

2. The guide vane according to claim 1, wherein said first attachment means and said second attachment means comprise bolts passing through passage orifices formed through the intrados and extrados bodies.

3. The guide vane according to claim 1, wherein said thermal conduction matrix comprises an external duct leaktight to lubricant, arranged in said space delimited between the intrados and extrados bodies.

4. The guide vane according to claim 1, wherein the guide vane comprises a lubricant sealing device formed between the intrados and extrados bodies.

5. The guide vane according to claim 1, wherein said space housing the thermal conduction matrix is generally in the form of a U defining two lubricant passages connected together by a bend.

6. The guide vane according to claim 1, wherein the thermal conduction matrix is made in a single piece, or using several distinct matrix elements arranged end to end or separated from each other.

7. A turbomachine for an aircraft, comprising a plurality of guide vanes according to claim 1, located downstream or upstream from a fan of the turbomachine.

8. The turbomachine for an aircraft according to claim 7, wherein the first and second attachment means are arranged outside said complete or partial fan air flow, delimited by at least one aerodynamic wall located between the external and internal elements of the case.

9. A method of fabrication of a vane according to claim 1, wherein the method of fabrication comprises the following steps:
   a) make intrados and extrados bodies and said thermal conduction matrix;
   b) attachment of the intrados body on the extrados body, using first and second attachment means.

10. The method of fabrication according to claim 9, wherein the thermal conduction matrix is made independently of the intrados and extrados bodies, and using the additive fabrication technique, or at least part of the thermal conduction matrix is made in a single piece with at least one of the intrados and extrados bodies.

\* \* \* \* \*